Oct. 11, 1932.  M. L. HAMLIN  1,882,571
PROCESS OF MELTING METALS IN CUPOLA FURNACES
Filed July 16, 1930
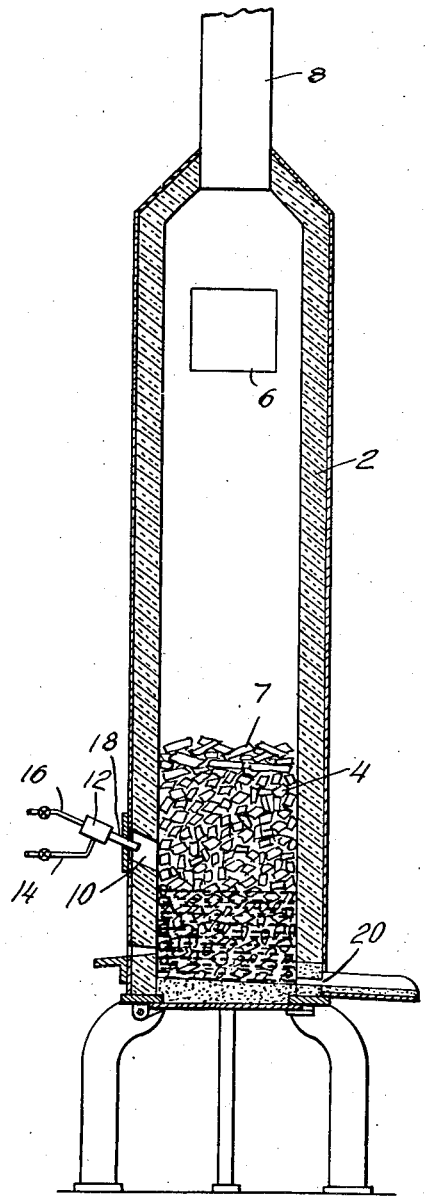
INVENTOR
Marston L. Hamlin
BY
ATTORNEY Patented Oct. 11, 1932

1,882,571

UNITED STATES PATENT OFFICE

MARSTON L. HAMLIN, OF LYNBROOK, NEW YORK, ASSIGNOR TO THE BARRETT COMPANY, OF NEW YORK, N. Y., A CORPORATION OF NEW JERSEY

PROCESS OF MELTING METALS IN CUPOLA FURNACES

Application filed July 16, 1930. Serial No. 468,329.

My invention relates to the melting and refining of metals and, particularly, to the treatment of non-ferrous metals in cupola furnaces.

In the usual practice of melting metals in cupola furnaces the fuel employed is coke which is introduced with the metal to be melted forming a bed of fuel and metal in the furnace. It has been suggested heretofore that the amount of coke consumed in the melting of metals could be reduced by introducing supplemental fuel such as oil or gas into the bed of coke and metal and burning the oil or gas with the coke. It has also been suggested that the metal in the furnace could be kept in an open or porous condition by maintaining a bed of refractory material in the lower portion of the furnace through which the melted metal percolates. However, so far as is known to the applicant, such methods of operation have not been suggested or employed in the melting or refining of non-ferrous metals and in no case has a mixture of gaseous or vaporized fuel and air or oxygen been introduced into a cupola furnace and burned in such a manner as to utilize the advantages of "flameless combustion" or "surface combustion" in the melting of metals.

The principal objects of my invention are to provide a process for melting and refining metals in cupola furnaces using gaseous or vaporized fuel instead of coke for supplying the heat to melt the metal, to utilize the catalytic properties of incandescent refractory material to aid in the combustion of fuel, and specifically to utilize "surface" or "flameless combustion" of fuel in the melting of non-ferrous metals.

In accordance with my invention, a bed of suitable refractory material is formed in the lower portion of the cupola furnace. The metal to be melted is placed on the bed of refractory material and the metal and refractory material heated by burning a mixture of fuel and air in regulated proportions in contact with the refractory material. I thus utilize the catalytic properties of incandescent refractory material in producing flameless or surface combustion of the fuel. By the use of surface combustion, it is possible greatly to accelerate the rate of combustion of the fuel and to concentrate the heat at the desired point in the furnace. The combustion of the fuel may be regulated and effectively so that the oxidizing, neutral or reducing atmosphere in the furnace can be accurately controlled as desired, and the introduction of excess air is obviated. This is of especial advantage in melting alloys containing easily oxidizable metals. Furthermore, owing to the large amount of radiant heat produced by this method of burning the fuel, the rate of heat transmission to the metal to be melted is very much greater than in the ordinary cupola furnace using solid fuel so that the metal can be melted in a shorter length of time than has been possible in previous cupola furnace operations. Another outstanding advantage in the use of surface combustion in the melting of metal is the fact that the furnace need not contain any additional fuel such as coke. Owing, therefore, to the absence of incandescent carbon in the furnace, there is little or no reduction of carbon dioxide to carbon monoxide and the products of combustion leave the furnace with a much larger proportion of carbon dioxide than is present in the stack gases ordinarily produced in cupola furnace operation. Thus the efficiency of the furnace in utilizing the heat produced by complete combustion of the fuel is very materially increased.

In practicing my invention care should be taken in choosing the refractory material to be employed in the furnace. The refractory material should be of such a nature that it can withstand the high temperature to which it will be subjected during operation for long periods of time without material deterioration. Ordinarily in the melting of non-ferrous metals having relatively low melting points, the tendency of the refractory material to fuse or deteriorate is much less than when the furnace is used for melting metals, such as iron, which has a relatively high melting point. Therefore, my invention is particularly applicable for the melting of non-ferrous metals such as copper and its alloys, brass and bronze, the white metals, zinc, tin, lead, and antimony, and alloys of these metals such as Babbitt metal and solder. The refractory materials which I prefer are silica brick, magnesia brick, carborundum and fire clay. However, in some instances I may employ coke as the refractory material in the furnace, especially coke of low ash and sulfur content, for instance, coke made from coal tar pitch or from petroleum residue.

In order to utilize the advantages of flameless combustion to the greatest extent, the fuel employed is in the form of a gas or vapor and is mixed with air or oxygen in predetermined proportions prior to its introduction into the furnace. For this purpose I prefer to employ a mixture containing substantially the theoretical amount of air or oxygen required for the complete combustion of the fuel. The rate at which the mixture of fuel and air is introduced into the furnace is determined by the rate of flame propagation back through the mixture, and should be sufficiently great at some point near the zone of combustion to prevent flashing back of the flame into the tuyère or nozzle through which the mixture of fuel and air in introduced.

The process of carrying out my invention is as follows: The metal to be melted is placed on the bed of refractory material in the lower portion of the furnace. The refractory material is heated to incandescence and a mixture of fuel and air preferably in approximately theoretical proportions for complete combustion of the fuel is introduced into the furnace and projected against the refractory material at a point located below the metal to be melted. Combustion of the fuel takes place with accelerated rapidity due to the catalytic action of the incandescent surfaces of the refractory material. The fuel burns with little or no flame and the heat produced is transmitted as radiant and conducted heat through the bed of refractory material so that the whole bed of refractory material becomes incandescent and the metal placed upon the bed of refractory material is melted very rapidly.

Any suitable type of cupola furnace may be employed in carrying out my invention but in order that the invention will be more clearly understood, reference is made to the accompanying figure of the drawing which illustrates diagrammatically a vertical section through a conventional type of cupola furnace. The furnace illustrated comprises a vertical stack 2 in the lower portion of which is a bed of refractory material 4. The metal to be melted is introduced into the furnace through a charging door 6 and forms a layer 7 on top of the bed of refractory material 4. The products of combustion leave the furnace through the flue 8. The fuel to be burned is mixed with air or oxygen and introduced into the furnace through one or more passageways 10 in the side wall of the stack located at a point below the upper surface of the bed of refractory material. Fuel to be burned is supplied to a mixing device 12 in regulated amounts through the valve-controlled pipe 14 and the air for supporting combustion of the fuel is supplied to the mixing device 12 in regulated proportions through the valve-controlled pipe 16. The mixture thus produced and containing fuel and air or oxygen in the desired proportions is projected against the bed of incandescent refractory material by means of the injector or nozzle 18 and burns without flame. The metal as it melts flows downwardly through the refractory material and collects in the lower portion of the furnace from which it is removed through the tap hole 20.

The complete combustion of the mixture of fuel and air with surface combustion enables the melting of metal on a bed of incandescent coke to be effected without substantial combustion of the coke itself.

Although one particular form of cupola furnace suitable for use in carrying out my invention has been shown and described, the invention is not limited to its use with this particular type of furnace. Furthermore, the process may be varied in numerous respects without departing from the scope of the invention as defined by the claims.

I claim:

1. The process of melting and refining metals in a cupola furnace which comprises forming a bed of refractory material in the furnace, placing the metal to be melted upon the refractory material, heating the refractory material to incandescence, admixing exteriorly of the refractory material in the cupola gaseous fuel and combustion-supporting gas in substantially theoretical proportions for complete combustion of the gaseous fuel, introducing the resultant mixture of gaseous fuel and combustion-supporting gas into contact with the incandescent surface of the refractory material whereby surface combustion of the gaseous fuel takes place with concentration of the resultant heat in the neighborhood of the metal.

2. The process of melting non-ferrous metals in a cupola furnace which comprises providing a bed of pitch coke within the furnace, placing non-ferrous metal to be melted on said bed of pitch coke in the furnace, heating the pitch coke to incandescence, admixing exteriorly of the pitch coke in the furnace gaseous fuel and combustion-supporting gas in substantially theoretical proportions for complete combustion of the gaseous fuel, introducing the resultant mixture of gaseous fuel and combustion-supporting gas into contact with the incandescent surface of the pitch coke, whereby surface combustion of the gaseous fuel takes place without substantial combustion of the pitch coke.

MARSTON L. HAMLIN.